(12) United States Patent
Rushing et al.

(10) Patent No.: US 8,908,500 B1
(45) Date of Patent: Dec. 9, 2014

(54) SYSTEMS AND METHODS FOR PROTECTING BONDING ENGINES IN NETWORK COMMUNICATIONS

(75) Inventors: Mickey Rushing, Hazel Green, AL (US); Troy W. White, Toney, AL (US)

(73) Assignee: ADTRAN, Inc., Huntsville, AL (US)

( * ) Notice: Subject to any disclaimer, the term of this patent is extended or adjusted under 35 U.S.C. 154(b) by 128 days.

(21) Appl. No.: 12/359,041

(22) Filed: Jan. 23, 2009

Related U.S. Application Data

(60) Provisional application No. 61/084,806, filed on Jul. 30, 2008.

(51) Int. Cl.
*G01R 31/08* (2006.01)
*H04J 3/16* (2006.01)

(52) U.S. Cl.
USPC .......................................... 370/217; 370/465

(58) Field of Classification Search
USPC ................................................. 370/217, 465
See application file for complete search history.

(56) References Cited

U.S. PATENT DOCUMENTS

| | | | |
|---|---|---|---|
| 6,128,300 A | 10/2000 | Horton | |
| 6,483,029 B1 | 11/2002 | Lutz, Jr. | |
| 6,560,201 B1 | 5/2003 | Amann et al. | |
| 6,724,880 B1 | 4/2004 | Lynch | |
| 6,775,305 B1 * | 8/2004 | Delvaux | 370/535 |
| 6,801,533 B1 | 10/2004 | Barkley | |
| 6,862,644 B1 | 3/2005 | Pendleton et al. | |
| 7,058,007 B1 * | 6/2006 | Daruwalla et al. | 370/216 |
| 7,106,760 B1 | 9/2006 | Perumal et al. | |
| 7,599,285 B2 * | 10/2009 | Zhou et al. | 370/217 |
| 7,639,620 B2 * | 12/2009 | Chapman | 370/235 |
| 7,706,255 B1 * | 4/2010 | Kondrat et al. | 370/219 |
| 7,760,624 B1 * | 7/2010 | Goodson et al. | 370/228 |
| 7,898,941 B2 * | 3/2011 | Rosenberg et al. | 370/217 |
| 2004/0114510 A1 | 6/2004 | Miller et al. | |
| 2004/0139473 A1 * | 7/2004 | Greene | 725/111 |
| 2005/0243497 A1 | 11/2005 | Cameron et al. | |
| 2006/0187911 A1 * | 8/2006 | Huotari et al. | 370/389 |
| 2006/0215689 A1 * | 9/2006 | Liu et al. | 370/465 |

FOREIGN PATENT DOCUMENTS

| | | | | |
|---|---|---|---|---|
| EP | 1962544 | * | 2/2007 | H04Q 11/04 |

OTHER PUBLICATIONS

Goodson, et al., U.S. Appl. No. 11/074,918, entitled, "Network Access Device and Method for Protecting Subscriber Line Communications," filed Mar. 8, 2005.

ITU-Telecommunications Standardization Sector, Study Group 15, "Centralized Bonding for G. Bond," Jul. 7-11, 2003, pp. 1-3.

* cited by examiner

*Primary Examiner* — Omar Ghowrwal
*Assistant Examiner* — Angel Brockman
(74) *Attorney, Agent, or Firm* — Maynard Cooper & Gale, P.C.; Jon E. Holland

(57) ABSTRACT

The present disclosure generally pertains to systems and methods for protecting bonding engines in network communications. In one exemplary embodiment, physical communication links, such as subscriber lines, of a bonding group are terminated by a plurality of access modules such that at least some of the communication links remain operational in the event of a failure of one of the access modules. Further, a backup bonding engine is used to protect the group's bonding engine. In the event of a failure or other operational problem associated with the group's bonding engine, the backup bonding engine is used to fragment incoming messages and to send the fragments to the operational subscriber lines. Thus, the bonding group can survive an operational failure of the group's bonding engine.

2 Claims, 8 Drawing Sheets ered to as a "line card." At any network facility, there can be many (e.g., several thousand) line cards, which are typically held in slots of several chassis. If a line card experiences an operational problem, communication via any of the subscriber lines terminated by the card may be interrupted and/or degraded until the problem is discovered, diagnosed, and remedied. Further, if a bonding engine resides
SYSTEMS AND METHODS FOR PROTECTING BONDING ENGINES IN NETWORK COMMUNICATIONS

CROSS-REFERENCE TO RELATED APPLICATION

This application claims priority to U.S. Provisional Patent Application No. 61/084,806, entitled "Method for Bonding Engine Protection for Multi-Service Access Platform," and filed on Jul. 30, 2008, which is incorporated herein by reference.

RELATED ART

In telecommunication networks, multiple physical links (e.g., subscriber lines) are sometimes used to provide a virtual channel having a higher data bandwidth than that of any of the individual links making up the virtual channel. Logic used to implement the virtual channel is referred to as a "bonding engine," and the physical links are referred to as being "bonded" together by the bonding engine to form the virtual channel. Further, the multiple links that are bonded together to form a single, virtual channel are referred to as a "bonding group."

Typically, a bonding engine within a network, referred to hereafter as a "network bonding engine," receives a data stream to be communicated to a customer premises (CP) and divides the data across subscriber lines extending from a network facility, such as a central office, to the customer premises. A bonding engine at the customer premises, referred to hereafter as a "CP bonding engine," receives the data from the multiple subscriber lines and reassembles the data to form the original data stream received and divided by the network bonding engine. Similarly, a data stream to be communicated from the customer premises through the network is received by the CP bonding engine, which divides the data across the multiple subscriber lines. The network bonding engine receives such data and reassembles the data to form the original data stream received and divided by the CP bonding engine. In essence, subscriber line bonding allows a data stream to be fragmented and communicated across multiple subscriber lines to enable a higher aggregated data rate.

In a network facility, such as a central office, subscriber lines are terminated by circuitry residing on a printed circuit board, sometimes referred to as a "line card." At any network facility, there can be many (e.g., several thousand) line cards, which are typically held in slots of several chassis. If a line card experiences an operational problem, communication via any of the subscriber lines terminated by the card may be interrupted and/or degraded until the problem is discovered, diagnosed, and remedied. Further, if a bonding engine resides on a defective or failed line card, then the performance of all of the subscriber lines bonded by such bonding engine may be adversely affected regardless of whether any of such subscriber lines are terminated by the defective or failed line card.

Techniques for improving the reliability and robustness of telecommunication networks and, in particular, bonding groups within telecommunication networks are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for protecting bonding engines in network communications. In one exemplary embodiment, physical communication links, such as subscriber lines, of a bonding group are terminated by a plurality of access modules such that at least some of the communication links remain operational in the event of a failure of one of the access modules. Further, a backup bonding engine is used to protect the group's bonding engine. In the event of a failure or other operational problem associated with the group's bonding engine, the backup bonding engine is used to fragment incoming messages and to send the fragments to the operational subscriber lines. Thus, the bonding group can survive an operational failure of the group's bonding engine.

Figure 1:
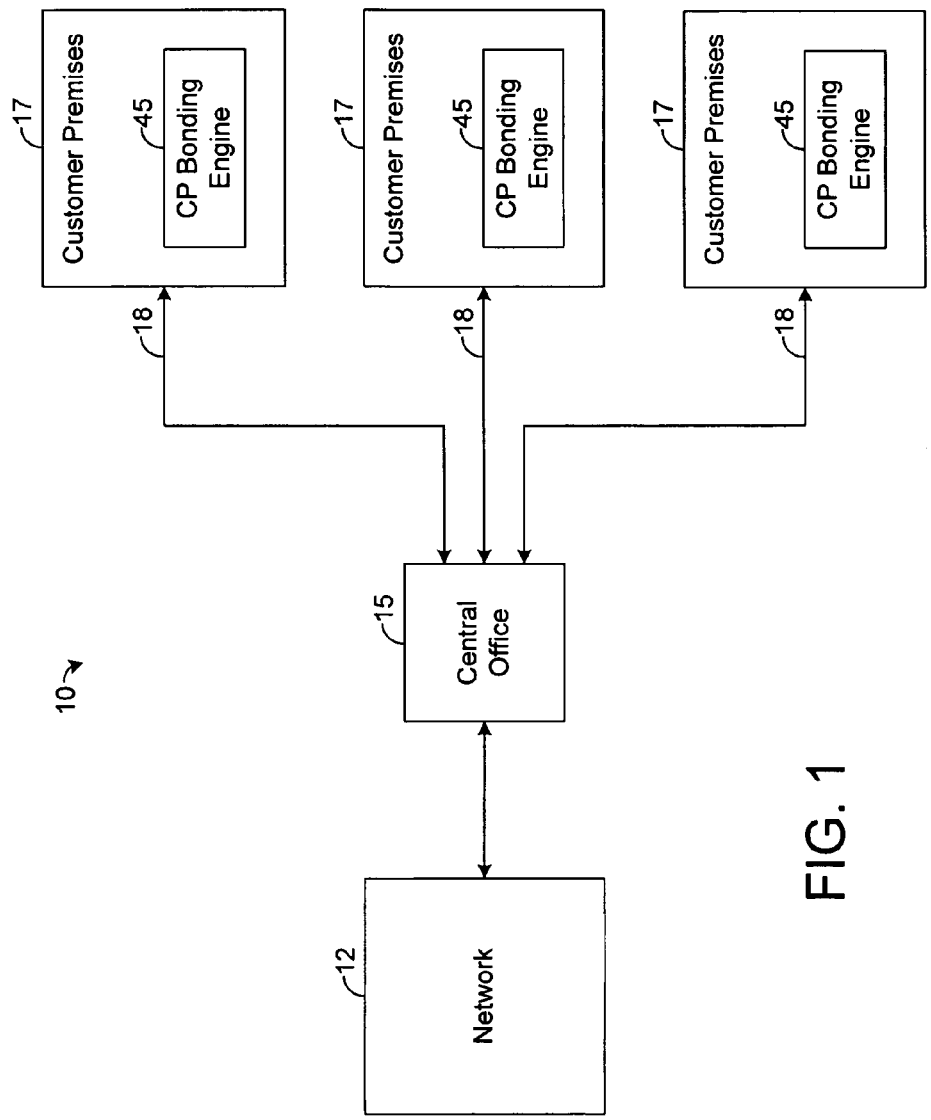
FIG. 1 is a block diagram illustrating an exemplary embodiment of a telecommunication system.

FIG. 1 depicts an exemplary embodiment of a telecommunication system 10 in accordance with the present disclosure. The system 10 has a network 12, such as the Public Switched Telephone Network (PSTN) or Internet, that routes data. A network facility, such as a central office (CO) 15, receives from the network 12 data destined for equipment at customer premise (CP) 17 and transmits such data to the customer premise 17 via subscriber lines 18. Further, data from the customer premise 17 is received by the central office 15, which interfaces such data with the network 12 for routing. Various types of protocols may be used for the communication between the central office 18 and the customer premise 17. As an example, data may be communicated between the central office 15 and the customer premise 17 via various digital subscriber line (DSL) protocols, such as Asymmetric Digital Subscriber Line (ADSL), High-Bit-rate Digital Subscriber Line (HDSL), HDSL2, HDSL4, Very-high-data-rate Digital Subscriber Line (VDSL), etc. In other embodiments, other types of protocols may be used to communicate data between the central office 15 and the customer premise 17.

Figure 2:
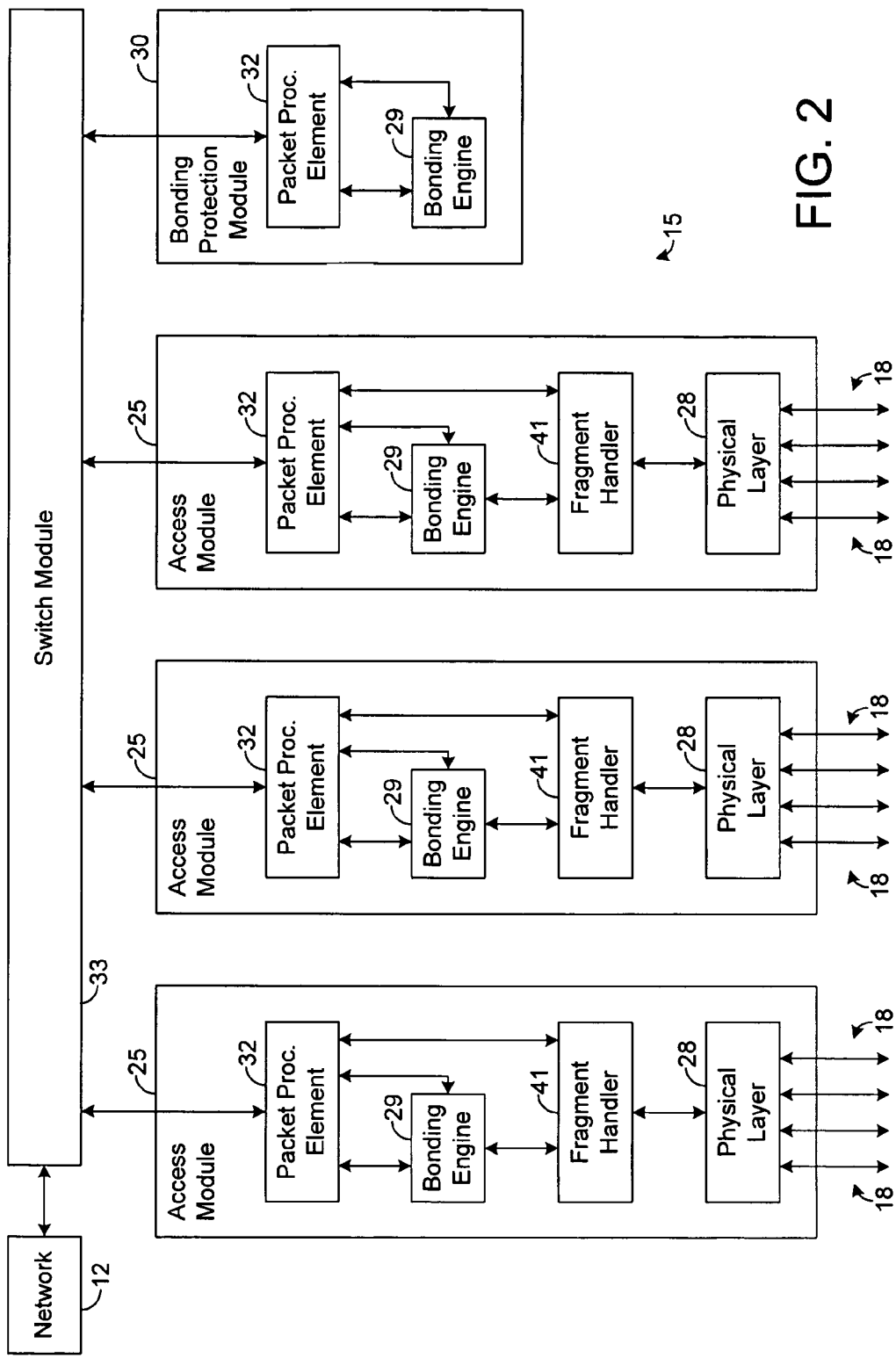
FIG. 2 is a block diagram illustrating an exemplary embodiment of equipment at a network facility, such as a central office.

FIG. 2 depicts an exemplary embodiment of equipment residing at the central office 15 or other network facility, such as a remote terminal. The central office 15 shown by FIG. 2 has a plurality of access modules 25 that are coupled to and terminate the subscriber lines 18. As shown by FIG. 2, each access module 25 has a physical layer 28 comprising circuitry for terminating the subscriber lines 18 that are coupled to the respective access module 25. As further shown by FIG. 2, the central office 15 also has at least one bonding protection module 30, which will be described in more detail hereafter.

Each access module 25 has a bonding engine 29, which will be described in more detail below, and a packet processing element 32 that is coupled to a switch module 33, which switches data between the modules 25 and the network 12. In this regard, the switch module 33 receives from the network 12 data packets that are destined for equipment at the customer premise 17. Each data packet has a header and a data portion. Control and routing information is included in the header, and payload data is included in the data portion. As an example, the header of a data packet may include a destination address identifying a communication device at a customer premises 17 to which the data packet is to be routed. In one exemplary embodiment, the header includes a Virtual Local Area Network (VLAN) tag. Other types of information may be included in the header, as is known in the art. In one exemplary embodiment, the data packets received from the network 12 are in accordance with Ethernet protocol, but other types of packet protocols may be used in other embodiments.

For each packet received from the network 12, the switch module 33 transmits the packet to the appropriate access module 25 based on information in the packet's header, such as the destination address or VLAN tag included in the header. In one exemplary embodiment, all of the packets to be carried by the same bonding group (e.g., having the same destination address or VLAN tag) are routed to the same access module 25. For example, assume that a customer premises 17 is serviced by a bonding group for which one of the bonding engines 29, referred to hereafter as the "primary bonding engine," bonds a plurality of subscriber lines 18. Upon receiving a data packet, referred to hereafter as the "original data packet," that is to be communicated to such customer premises 17 by the bonding group, the switch module 33 is configured to transmit the original data packet to the access module 25, referred to hereafter as the "primary access module," that has the group's primary bonding engine 29. When the original data packet is received by the packet processing element 32 of such access module 25, the packet processing element 32 performs various processing on the packet before transmitting it to the module's bonding engine 29. For example, if desired, the packet processing element 32 may strip away portions of the header.

Upon receiving the original data packet, the primary bonding engine 29 is configured to fragment the original data packet into a plurality of fragments. Each of the fragments is to be transmitted by a respective one of the subscriber lines 18 of the bonding group. Each fragment is a data packet that may be smaller than the original data packet, although it is possible for a fragment to be as large or larger than any given data packet. In this regard, each fragment has a header and a data portion. Control and routing information is included in the header, and payload data is included in the data portion. As an example, the header may identify the subscriber line 18 that is to carry the fragment and the access module 25 that terminates such subscriber line 18. In one exemplary embodiment, fragments are packetized in accordance with the same protocol used for the original data packet from the network 12. For example, the original data packet and the fragments may be packetized in accordance with Ethernet protocol. Other types of protocols are possible in other embodiments, and it is possible for the fragments to be packetized in accordance with a different protocol relative to the packets from the network 12.

Note that one or more of the subscriber lines 18 of the bonding group may be coupled to the primary access module 25, which has the primary bonding engine 29 (i.e., the engine that fragments the original data packet). For each fragment that is to be communicated by such a subscriber line 18, the primary bonding engine 29 transmits the fragment to a fragment handler 41 of the primary access module 25 without transmitting the fragment through the switch module 33. The fragment handler 41 may buffer fragments and/or perform other processing of the fragments. The fragment handler 41 interfaces each received fragment with the physical layer 28 such that the fragment is transmitted across the subscriber line 18 identified by the header of the fragment.

One or more of the subscriber lines 18 of the bonding group may be coupled to one or more of the access modules 25 other than the primary access module 25. For each fragment that is to be communicated by such a subscriber line 18, the primary bonding engine 29 transmits the fragment to the packet processing element 32 of the primary access module 25. The packet processing element 32 transmits each such fragment to the switch module 33, which transmits the fragment to the access module 25 that is coupled to the subscriber line 18 that is to carry the fragment. When such module 25 receives the fragment, the packet processing element 32 of the module 25 transmits the fragment to the module's fragment handler 41, which interfaces the fragment with the module's physical layer 28 such that the fragment is transmitted across the appropriate subscriber line 18 (e.g., the subscriber line 18 identified in the fragment's header).

Accordingly, each fragment is routed to the subscriber line 18 that is to carry the fragment regardless of which access module 25 such subscriber line 18 is coupled. Note that it is generally desirable to configure the bonding groups such that the subscriber lines 18 of the same bonding group are spread evenly across the access modules as much as is possible. For example, if n is the total number of subscriber lines 18 in a bonding group and if the total number of access modules 25 is equal to or greater than n, then there preferably is no more than one subscriber line 18 coupled to the same access module 25. If the total number (n) of subscriber lines 18 is greater than the total number (y) of access modules 25, then the maximum number of subscriber lines 18 coupled to the same access module 25 is equal to int(n/y)+1.

Spreading the subscriber lines 18 across the access modules 25 in such manner is unnecessary but helps to enhance the robustness of the system 10. In this regard, if any one of the access modules 25 fails, then communication across the subscriber lines 18 coupled to the failed access module may be impossible. In such a situation, the remaining subscriber lines 18 of the bonding group may carry the group's traffic resulting in a reduction of the data rate for the bonding group but nevertheless keeping communication alive despite the failed access module 25. Spreading the subscriber lines 18 of the same bonding group across the access modules 25 in an even manner, as described above, keeps the maximum number of subscriber lines 18 coupled to the same module 25 as low as possible. Thus, the impact to the overall data rate of the bonding group due to the failure of a single access module 25 is limited thereby helping to enhance the robustness of the system 10. However, in other embodiments, the subscriber lines of any given bonding group may be spread across multiple access modules 25 in any desired manner and/or may be coupled to the same access module 25, if desired. Commonly-assigned U.S. patent application Ser. No. 11/074,918, entitled "Network Access Device and Method for Protecting Subscriber Line Communications," and filed on Mar. 8, 2005, which is incorporated herein by reference, describes exemplary techniques for bonding across multiple modules.

Note that, for each bonding group, there is only one bonding engine 29 to which all of the data packets to be communicated by the bonding group are routed. Such bonding engine 29 may be located on any of the access modules 25. Hence, each access module 25 is shown as having a bonding engine 29 that can serve as the "primary boding engine" for a given bonding group. However, in other embodiments, it is possible to distribute the bonding engine 29 for any bonding group across multiple access modules 25, if desired, and/or for fragments to be communicated to multiple bonding engines 29.

In addition, data from the customer premise 17 may be communicated via paths reverse to those described above. In this regard, assume that a bonding engine 45 (FIG. 1) at a customer premises 17 fragments a message into a plurality of fragments that are communicated via a bonding group to the central office 15. The group's primary bonding engine 29 at the central office 15 is configured to receive each of the fragments and to reassemble the fragments into the message originally fragmented by the CP bonding engine 45. The primary bonding engine 29 then transmits the message to the packet processing element 32 of the group's primary access module 25, and the packet processing element 32 packetizes the message into at least one data packet compatible with the network 12. For example, in one exemplary embodiment, the packet processing element 32 packetizes the message via Ethernet protocol, but other types of protocols may be used in other embodiments. The packet processing element 32 transmits the data packet formed by the element 32 to the switch module 33, which transmits such packet to the network 12.

Note that the switch module 33 may be used to communicate fragments received from the subscriber lines 18. In this regard, if a fragment carried by a bonding group is received by the physical layer 28 on the group's primary access module 25, then the physical layer 28 provides the fragment to the fragment handler 41, which transmits the fragment to the group's primary bonding engine 29 without transmitting the fragment to the switch module 33. However, if a fragment is received by the physical layer 28 on a module 25, referred to as the "receiving module," other than the group's primary access module 25, then the fragment handler 41 of the receiving module 25 transmits the fragment to the packet processing element 32 of the receiving module 25. The packet processing element 32 transmits the fragment to the switch module 33, which transmits the fragment to the packet processing element 32 of the group's primary access module 25. The packet processing element 32 then provides the fragment to the primary bonding engine 29. Thus, the group's primary bonding engine 29 receives each fragment regardless of which of the subscriber lines 18 of the bonding group carries the fragment.

Figure 3:
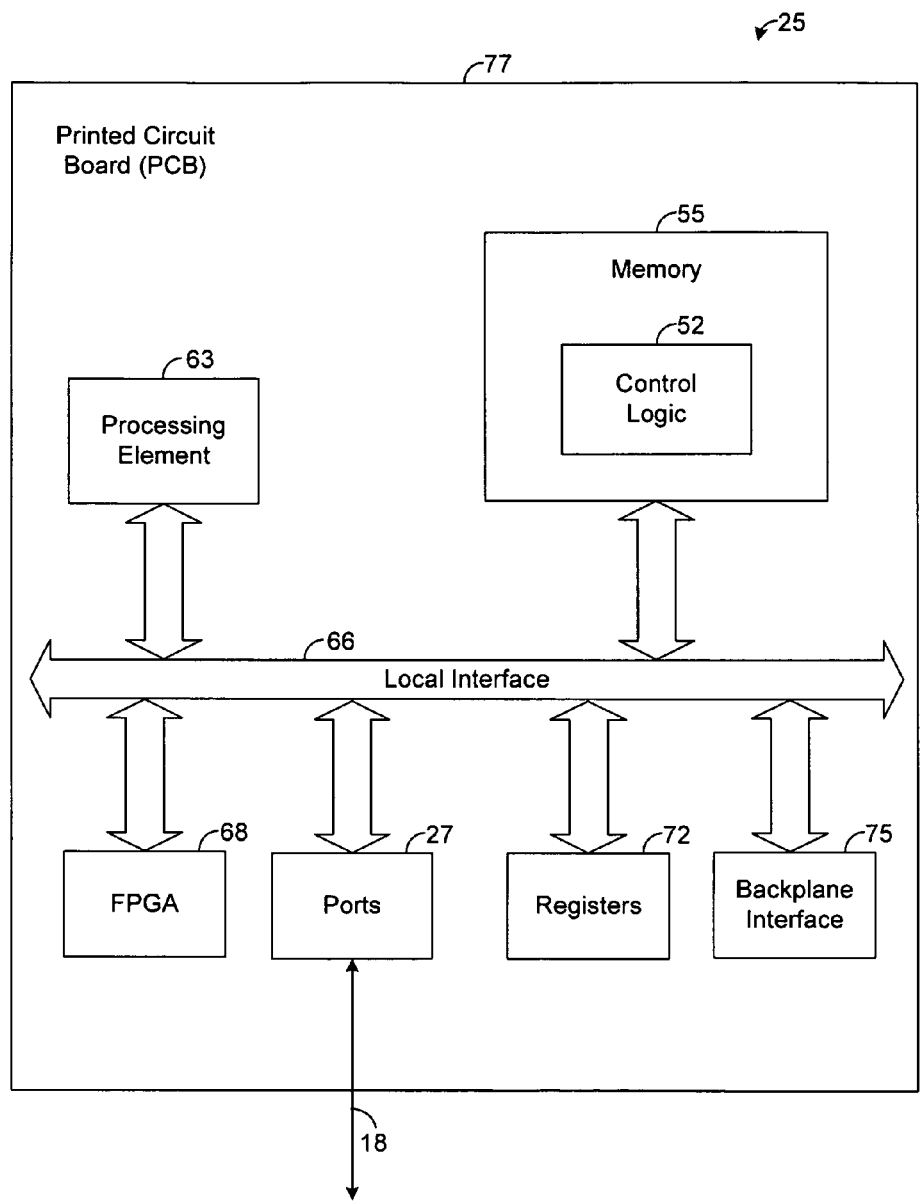
FIG. 3 is a block diagram illustrating an exemplary embodiment of an access module, such as is depicted by FIG. 2.

Each access module 25 comprises various hardware for terminating and driving the subscriber lines 18. However, if desired, the access modules 25 may include software, firmware, and/or other hardware for performing other functions. Indeed, the components of the access modules 25 may be implemented in hardware or a combination of hardware, software, and/or firmware. FIG. 3 depicts an exemplary embodiment of an access module 25. The exemplary access module 25 shown by FIG. 3 comprises control logic 52 implemented in software and stored in memory 55. The control logic 52, when implemented in software, can be stored and transported on any computer-readable medium for use by or in connection with an instruction execution apparatus that can fetch and execute instructions.

The exemplary embodiment of the access module 25 depicted by FIG. 3 comprises at least one conventional processing element 63, such as a digital signal processor (DSP) or a central processing unit (CPU), that communicates to and drives the other elements within the module 25 via a local interface 66, which can include at least one bus. For example, when the control logic 52 is implemented in software, the processing element 63 retrieves and executes instructions of the control logic 52.

Furthermore, the access module 25 comprises a field programmable gate array (FPGA) 68 for implementing hardware portions of the bonding engine 29, packet processing element 32, fragment handler 41, and/or physical layer 28. The access module 25 also has registers 72 for storing various configuration settings, as will be described in more detail hereafter. A backplane interface 75 comprises a connector for interfacing the module 25 with a backplane of a chassis (not shown in FIG. 3), as will be described in more detail hereafter. The access module 25 has a plurality of ports 27 coupled to subscriber lines 18.

As shown by FIG. 3, the components of the module 25 reside on a single printed circuit board (PCB) 77, and the access module 25 is sometimes referred to as a "line card" or just "card." However, it is possible for the components of the access module 25 to reside on more than one PCB, if desired.

The registers 72 store various configuration settings useful in the operation of the access module 25. In this regard, the configuration settings preferably specify how various data packets and/or fragments are to be handled. As an example, the configuration settings may indicate how fragments received by the physical layer 28 from a subscriber line 18 are to be processed. For example, the configuration settings may indicate that fragments from a particular subscriber line 18 are to be bonded by the bonding engine 29 of the same module 25. Based on such configuration settings, the fragment handler 41 transmits the fragments from such subscriber line 18 to the bonding engine 29. In another example, the configuration settings may indicate that fragments received from a particular subscriber line 18 are to be transmitted to another access module 25 for bonding on that access module 25. Based on such configuration settings, the fragment handler 41 of the receiving module 25 transmits the fragments from such subscriber line 18 to the packet processing element 32 of the receiving module 25. The fragment handler 41 also inserts into the fragment's header an identifier of the access module 25 that is to bond the fragment. Thus, the fragment is routed via the switch module 33 to the appropriate access module 25 for bonding.

Further, the configuration settings may indicate how fragments from the bonding engine 29 are to be processed. For example, the configuration settings may correlate the destination addresses or VLAN tags of data packets from the network 12 with subscriber line addresses and access module addresses. In this regard, assume that a bonding group includes four subscriber lines 18 such that each data packet having a particular destination address or VLAN tag is to be transmitted by the bonding group. In such example, the configuration settings in the registers 72 may correlate the particular destination address or VLAN tag with the subscriber line addresses that identify the four subscriber lines 18 of the bonding group. Thus, upon receiving a data packet having the particular destination address or VLAN tag, the group's primary bonding engine 29 fragments the data packet into a plurality of fragments and selects from the correlated subscriber line addresses when defining the fragment headers for such fragments. Each subscriber line address is correlated with the address of the access module 25 that terminates the identified subscriber line 18. For each fragment, the subscriber line address for the subscriber line 18 selected to carry the fragment and its corresponding access module address are included in the fragments' header. Accordingly, the fragments are only carried by subscriber lines 18 within the bonding group (e.g., subscriber lines correlated with the particular destination address or VLAN tag).

In addition, the subscriber lines 18 of other bonding groups may be similarly correlated with other destination addresses or VLAN tags so that the bonding engine 29 can select from the appropriate set of subscriber line addresses for each received data packet. In other embodiments, information other than destination addresses or VLAN tags may be used as keys to select which bonding group is to carry a received data packet.

In one exemplary embodiment, when fragmenting data packets for a particular bonding group, a bonding engine 29 attempts to allocate the fragments across all of the active subscriber lines 18 of the bonding group so that each active subscriber line 18 carries at least some of the fragments. Note that the term "active" recognizes that all of the subscriber lines 18 of a bonding group may not be operational at any given time. The term "active" refers to the subscriber lines 18 of the bonding group that are capable of communicating fragments from the group's primary bonding engine 29. A subscriber line 18 may become inactive due to a variety of reasons, such as problems with the subscriber line 18 or with other components. For example, a subscriber line 18 may become inactive because it is unable to receive fragments from a bonding engine 29 even though the subscriber line 18 would otherwise be able to successfully transmit fragments to its respective customer premises 17.

Note that access module addresses inserted into the fragment headers are used by the switch module 33 to switch the fragments. In this regard, as described above, a group's primary bonding engine 29, based on the configuration settings in the registers 72, inserts a subscriber line address and an access module address into the header of each fragment that is provided by the primary bonding engine 29 for the bonding group. Some of the fragments may be carried by subscriber lines 18 coupled to the same access module 25 (i.e., the group's primary access module), and some of the fragments may be carried by subscriber lines 18 coupled to other access modules 25. The fragments that are not to be carried by subscriber lines 18 coupled to the group's primary access module 25 are transmitted through the switch module 33 from the group's primary access module to the other access modules 25. The switch module 33 is configured to switch the fragments, based on the access module addresses in the fragment headers, so that they arrive at the appropriate access modules 25. Further, when a fragment handler 41 receives a fragment either from the bonding engine 29 of the same module 25 or from the switch module 33, the fragment handler 41, based on the subscriber line address in the fragment's header, interfaces the fragment with the physical layer 28 such that the fragment is carried by the identified subscriber line 18. Thus, the subscriber line addresses and access module addresses defined by the primary bonding engine 29 of a bonding group based on the configuration settings in the registers 72 are used to route the fragments to the appropriate subscriber lines 18 for transmission.

In one exemplary embodiment, the configuration settings in the registers 72 are provisioned by a user during installation such that the configuration settings are defined before data communication commences. Techniques for provisioning line cards are generally well-known in the art. In one exemplary embodiment, the control logic 52 is responsible for defining and maintaining the configuration settings stored in the registers 72. For example, during provisioning, the control logic 52 may receive a user input for updating the registers 72. Such an input may be received from the network 12 or otherwise. As a mere example, a technician may utilize a user input device (not shown) at a remote location, and the user input may be transmitted via the network 12 to the access module 25. In another example, the technician may be local to the access module 25 so that use of the network 12 is unnecessary. In any event, the control logic 52 receives the user input and updates the registers 72 as appropriate in response to the user input.

Note that the configuration settings in the registers 72 can be changed at any time. For example, after data communication has begun, a user may decide to change which bonding group a particular subscriber line 18 is allocated. Thus, the user may submit an input for making the desired change, and the control logic 52 may dynamically update the registers 72 without significantly interrupting the communication services provided by the access module 25.

Figure 4:
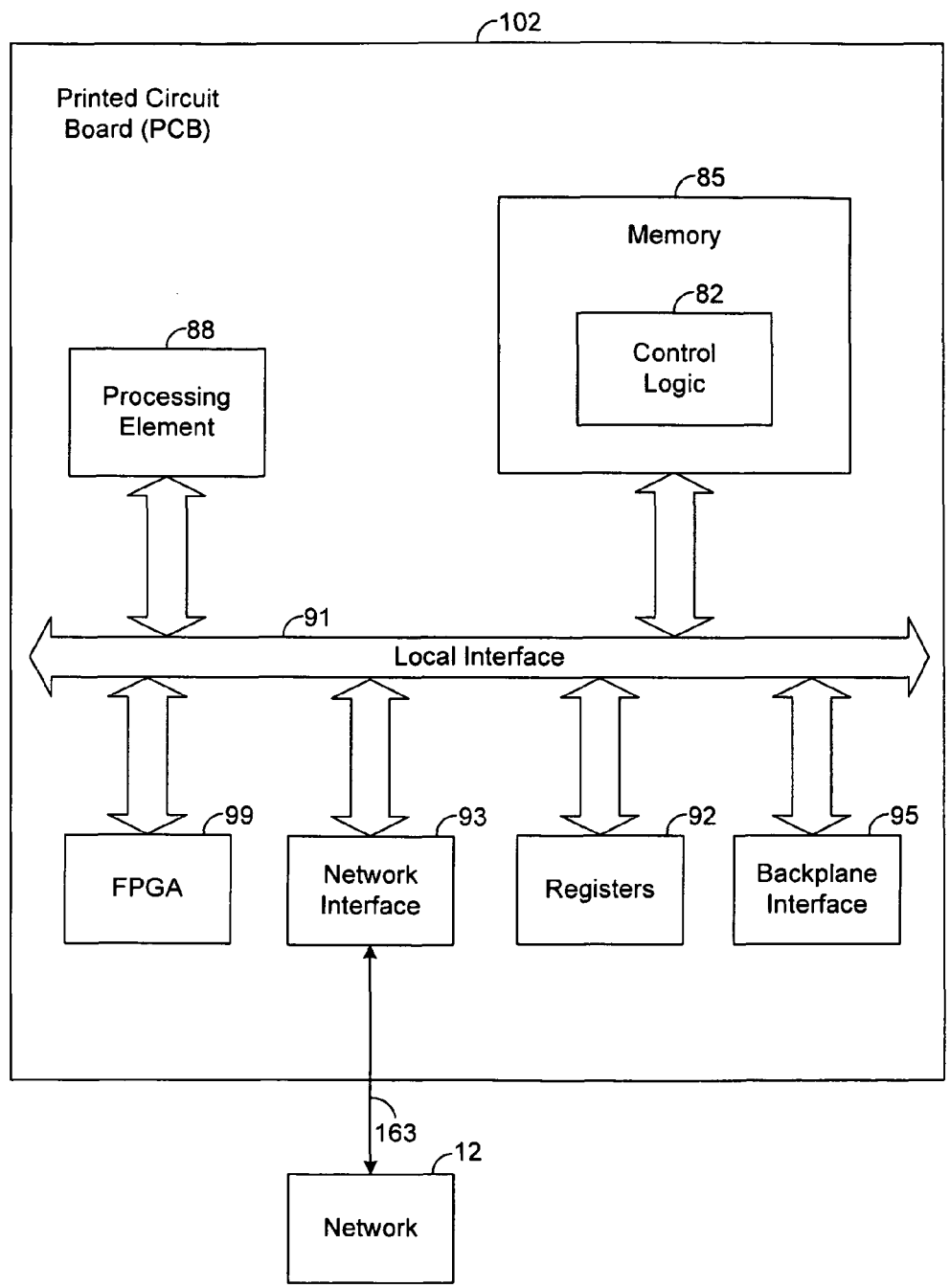
FIG. 4 is a block diagram illustrating an exemplary embodiment of a switch module 30, such as is depicted by FIG. 2.

FIG. 4 depicts an exemplary embodiment of the switch module 33. The exemplary switch module 33 shown by FIG. 4 comprises control logic 82 implemented in software and stored in memory 85. In other embodiments, the control logic 82 can be implemented in hardware or any combination of hardware, software, and/or firmware. The control logic 82, when implemented in software, can be stored and transported on any computer-readable medium for use by or in connection with an instruction execution apparatus that can fetch and execute instructions.

The exemplary embodiment of the switch module 33 depicted by FIG. 4 comprises at least one conventional processing element 88, such as a digital signal processor (DSP) or a central processing unit (CPU), that communicates to and drives the other elements within the module 33 via a local interface 91, which can include at least one bus. For example, when the control logic 82 is implemented in software, the processing element 88 retrieves and executes instructions of the control logic 82.

Furthermore, the switch module 33 has registers 92 for storing various configuration settings, as will be described in more detail hereafter. A backplane interface 95 comprises a connector for interfacing the module 33 with a backplane of a chassis (not shown in FIG. 4), as will be described in more detail hereafter. The switch module 33 has a field programmable gate array (FPGA) 99 for performing switching operations, as will be described in more detail hereafter. The switch module 33 also has a network interface 93 coupled to a network connection 163, such as a fiber optic cable. As shown by FIG. 4, the components of the switch module 33 reside on a single printed circuit board (PCB) 102, also referred to as "card," although it is possible for such components to reside on multiple PCBs in other embodiments.

The configuration settings in the registers 92 indicate how data from the network 12, access modules 25, and protection module 30 are to be routed. When a message (e.g., a data packet or a fragment) is received, the FPGA 99 based on the configuration settings in the registers 92 determines where to send the message. In one exemplary embodiment, the data packets received from the network 12 have VLAN tags in their headers, and the registers 92 indicate where the packets are to be transmitted based on their VLAN tags. Thus, upon receiving a data packet from the network 12, the FPGA 99 consults the registers 92 using the VLAN tag in the packet's header and, based on information in the registers 92, determines which of the modules 25 or 30 is to receive the packet. The FPGA 99 then transmits the packet to the appropriate module 25 or 30. In one exemplary embodiment, the fragments received by the switch module 33 from the modules 25 or 30 have module addresses in their headers, and the registers 92 indicate where the fragments are to be transmitted based on their module addresses. Thus, upon receiving a fragment from a module 25 or 30, the FPGA 99 consults the registers 92 using the module address in the fragment's header and, based on information in the registers 92, determines which of the modules 25 or 30 is to receive the packet. The FPGA 99 then transmits the packet to the appropriate module 25 or 30.

As shown by FIG. 2, the bonding protection module 30, like each of the access modules 25, has a packet processing element 32 and a bonding engine 29 that are generally configured to operate as described above. However, in one exemplary embodiment, as shown by FIG. 2, the bonding protection module 30 does not terminate any of the subscriber lines 18, although it is possible for the module 30 to be coupled to and terminate subscriber lines 18 in other embodiments. As will be described in more detail hereafter, the bonding engine 29 of the module 30 serves as a backup for any of the bonding engines 29 of the access modules 25. Thus, in the event of an operational problem associated with one of the access modules 25, bonding operations can be switched from the problematic access module 25 to the bonding engine 29 of the protection module 30.

Figure 5:
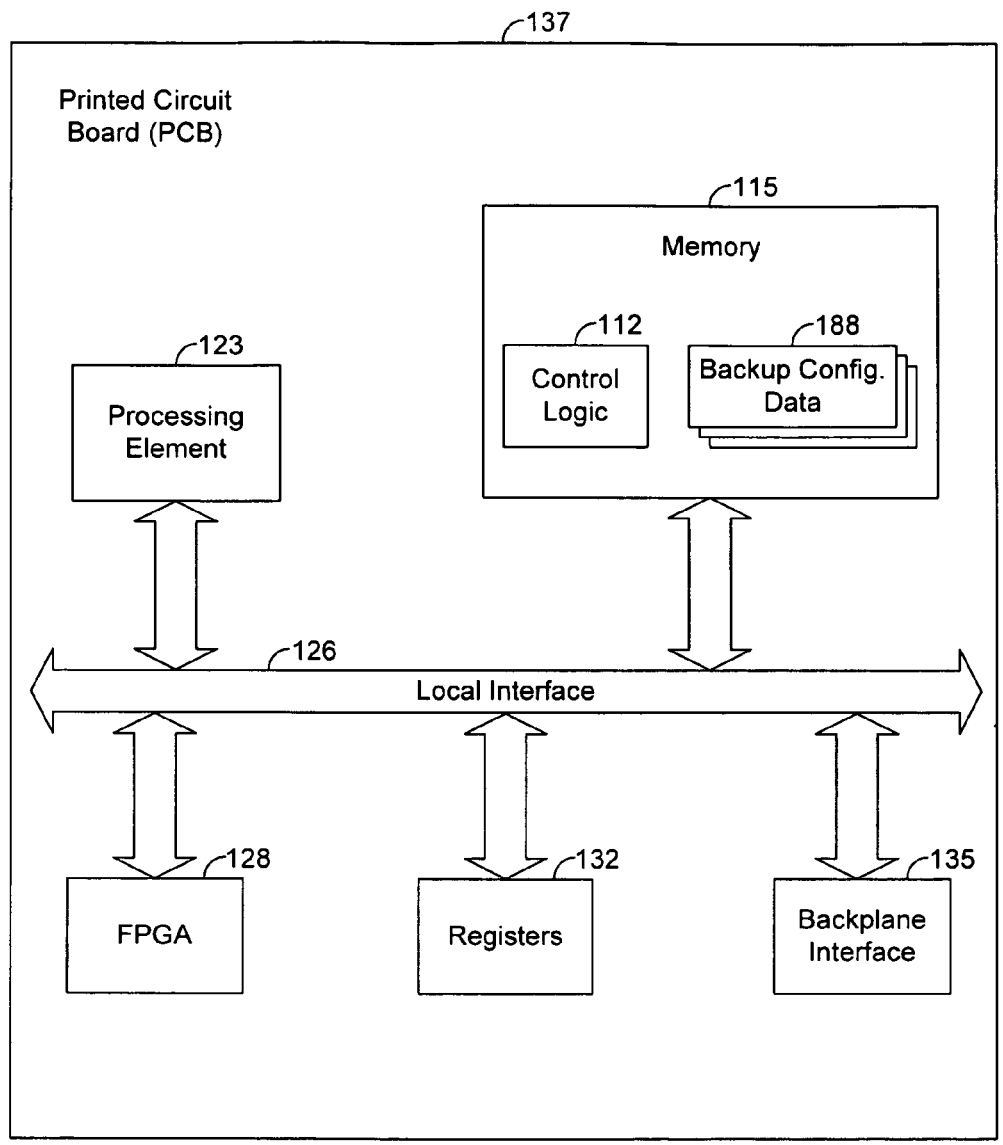
FIG. 5 is a block diagram illustrating an exemplary embodiment of a bonding protection module, such as is depicted by FIG. 2.

FIG. 5 depicts an exemplary embodiment of the bonding protection module 30. The exemplary protection module 30 shown by FIG. 5 comprises control logic 112 implemented in software and stored in memory 115. In other embodiments, the control logic 112 can be implemented in any combination of hardware, software, and/or firmware. The control logic 112, when implemented in software, can be stored and transported on any computer-readable medium for use by or in connection with an instruction execution apparatus that can fetch and execute instructions.

The exemplary embodiment of the protection module 30 depicted by FIG. 5 comprises at least one conventional processing element 123, such as a digital signal processor (DSP) or a central processing unit (CPU), that communicates to and drives the other elements within the module 30 via a local interface 126, which can include at least one bus. For example, when the control logic 112 is implemented in software, the processing element 123 retrieves and executes instructions of the control logic 112.

Furthermore, the protection module 30 comprises a field programmable gate array (FPGA) 128 for implementing hardware portions of the bonding engine 29 and/or packet processing element 32. The protection module 30 also has registers 132 for storing various configuration settings, as will be described in more detail hereafter. A backplane interface 135 comprises a connector for interfacing the module 25 with a backplane of a chassis (not shown in FIG. 5), as will be described in more detail hereafter. As shown by FIG. 5, the components of the module 30 reside on a single printed circuit board (PCB) 137, also referred to as a "card," although it is possible for the components of the protection module 30 to reside on more than one PCB, if desired.

Figure 6:
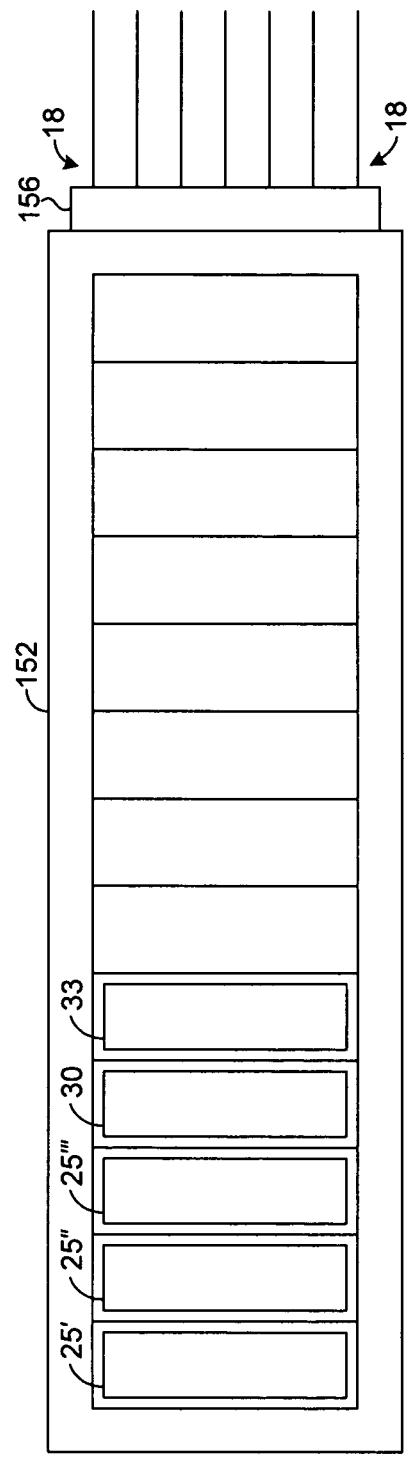
FIG. 6 depicts an exemplary chassis holding network facility equipment, such as is depicted by FIG. 2.

In one exemplary embodiment, the switch module, the access modules, and the protection module are respectively inserted into slots of a chassis 152, as shown by FIG. 6. FIG. 6 depicts one protection module 30, one switch module 33, and three access modules 25', 25", and 25", but other numbers of such modules are possible in other embodiments. Each of the subscriber lines 18 is coupled to a subscriber line interface 156 mounted on the chassis 152. The subscriber line interface 156 interfaces the subscriber lines 18 with a chassis backplane 161 (FIG. 7), which couples the subscriber lines 18 to the access modules 25. The chassis backplane 161 also couples each module 25 and 30 to the switch module 33. In this regard, the backplane 161 comprises a plurality of conductive connections (e.g., copper traces) for conductively coupling the subscriber lines 18, the network connection 163 and the modules 25', 25", 25"', and 30 to the switch module 33. The chassis backplane 161 is conductively coupled to the backplane interface 75 (FIG. 3) of each access module, the backplane interface 95 (FIG. 4) of the switch module 33, and the backplane interface 135 (FIG. 5) of the bonding protection module 30.

Figure 7:
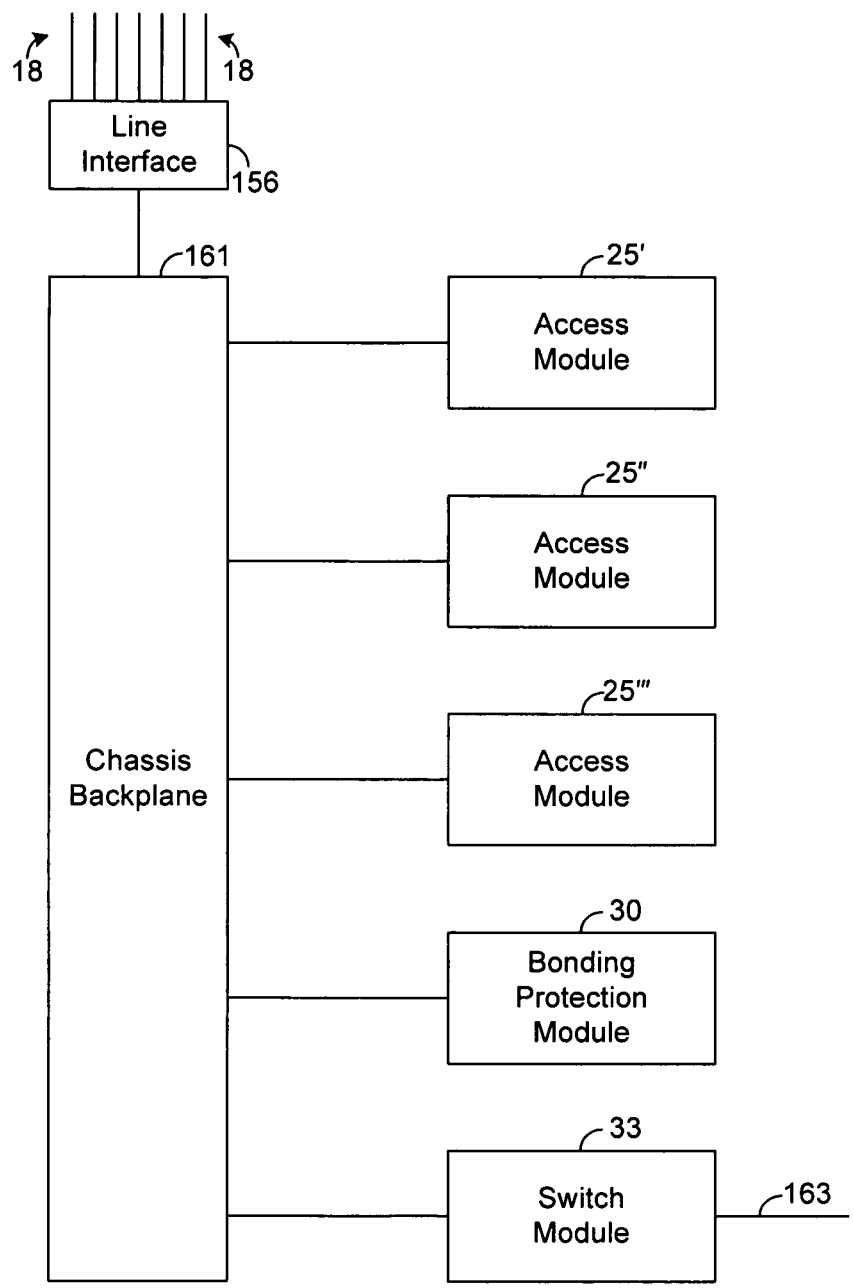
FIG. 7 is a block diagram illustrating an exemplary embodiment of network facility equipment, such as is depicted by FIG. 2.

A network connection 163, such as a fiber optic cable, for example, carrying a high-speed data stream is coupled to the switch module 33, as shown by FIG. 7. If the network connection 163 is indeed fiber optic, the switch module 33 may include a fiber optic transceiver (not shown) to convert optical signals from the connection 163 into electrical signals and for converting electrical signals from the switch module 33 into optical signals.

The embodiment shown by FIG. 7 is exemplary, and various modifications may be made such embodiment. For example, the network connection 163 may be coupled to the switch module 33 through the chassis backplane 161, and/or the subscriber lines 18a-c may be coupled directly to the access modules 25', 25", and 25"' similar to how the network connection 163 is coupled directly to the switch module 33.

In one exemplary embodiment, the switch module 33 is configured to detect an operational problem associated with one of the access modules 25', 25", and 25"'. For example, one of the access modules may experience a failure such that the access module and, in particular, the bonding engine 29 of the access module is unable to communicate with the switch module 33 and other modules. Other types of operational problems may occur in other examples.

Note that there are a variety of techniques that may be used to detect an operational problem associated with an access module 25', 25", or 25"'. For example, in one exemplary embodiment, the control logic 82 (FIG. 4) of the switch module 33 is configured to periodically ping each access module 25', 25", and 25"'. The packet processing element 32 of each access module is configured to reply to the ping. If the switch module 33 does not receive a reply within a predefined time period after sending a ping to a particular access module, then the control logic 82 detects an operational problem associated with that access module. In another example, the control logic 82 of the switch module 33 is configured to monitor the messages received by the switch module 33. If at least one message is not received from a particular access module 25', 25", or 25"' within a predefined time period, then the control logic 82 detects an operational problem associated with that access module.

When the switch module 33 detects an operational problem with a particular access module, the bonding performed by such access module is switched to the backup bonding engine 29 of the protection module 30. There are various techniques that may be used to switch bonding from a bonding engine of a problematic access module to a backup bonding engine. Exemplary techniques will now be described in more detail below.

For illustrative purposes, assume that the bonding engine 29 of the access module 25' is the primary bonding engine for a particular bonding group, referred to hereafter as "Bonding Group A." Further assume that Bonding Group A includes subscriber lines 18 respectively coupled to each of the access modules 25', 25", and 25'". In addition, assume that the access module 25' fails such that communication with the module 25' no longer occurs. Thus, until bonding is switched from the bonding engine 29 of the failed access module 25' to the backup bonding engine 29 of the protection module 30, Bonding Group A is unable to communicate data with the customer premises 17 serviced by such bonding group.

The control logic 82 of the switch module 33 detects an operational problem associated with the module 25', such as by detecting that the module 33 is unable to communicate with the module 25'. In response, the control logic 82 initiates a backup switch for the failed module 25'. In this regard, the control logic 82 updates the registers 92 (FIG. 4) such that any data packet or fragment indicating that it is to be transmitted to the failed module 25' (e.g., having a module address identifying the failed access module 25') is instead transmitted to the protection module 30. Therefore, data packets from the network 12 that would have otherwise been directed to the failed module 25' are instead directed to the protection module 30. In addition, fragments from the subscriber lines 18 that otherwise would have been transmitted to the failed access module 25' by the switch module 33 are instead transmitted to the protection module 30.

In further implementing the backup switch, the control logic 82 transmits to the protection module 30 a notification indicating that an operational problem associated with the access module 25' has been detected. Such notification identifies the problematic access module 25'. In response, the control logic 112 of the protection module 30 configures the backup bonding engine 29 of the protection module 30 to begin performing the bonding previously performed by the bonding engine 29 of the failed module 25'. In addition, the backup bonding engine 29 of the protection module 30 is configured to direct, to the active subscriber lines 18 of Bonding Group A, the fragments resulting from the fragmentation performed by such backup bonding engine 29.

Thus, the data packets received by the protection module 30 from the network 12 are fragmented by the backup bonding engine 29 of such module 30 and the fragments are transmitted to the subscriber lines 18 of Bonding Group A, except for subscriber lines 18 that are terminated by the failed module 25'. Therefore, once bonding is switched from the bonding engine 29 of the failed module 25' to the backup bonding engine 29 of the protection module 30, the subscriber lines 18 of Bonding Group A coupled to the modules 25" and 25'" are able to communicate. In this regard, the backup bonding engine 29 of the protection module 30 provides such subscriber lines 18 with fragments of data packets allocated to Bonding Group A. Accordingly, the communication performed by Bonding Group A is able to survive the failure of the access module 25', although such communication may be slightly degraded due to the loss of subscriber lines 18 terminated by the failed access module 25'.

Note that the updates to the registers 92 (FIG. 4) of the switch modules 33 cause the switch module 33 to direct, to the protection module 30 instead of the failed access modules 25', fragments received by the access modules 25" and 25'" from the subscriber lines 18 of Bonding Group A. The backup bonding engine 29 of the protection module 30 is configured to reassemble such fragments into messages to be packetized by the packet processing element 32 of module 30 thereby providing data packets for the network 12.

Eventually, the failure of the module 25' may be detected and diagnosed by a technician who then replaces the failed module 25' with a new module 25'. At this time, the bonding for Bonding Group A may be switched back to module 25'. In this regard, the technician may provision the switch module 33 and modules 25', 25", 25'", and 30 to effectuate the switch back. Alternatively, in response to a user input indicating that the switch back is to occur, the control logic 82 of the protection module 30 may be configured to automatically restore the original settings of the registers in the switch module 33 and the modules 25', 25", 25', and 30 such that the switch back is effectuated.

In one exemplary embodiment, as shown by FIG. 5, sets of backup configuration data 188 are predefined and stored in the memory 115 of the protection module 30. Each set of backup configuration data 188 is correlated with a different one of the access modules 25', 25", and 25'" and indicates the configuration settings that are to be used in the event of detection of an operational problem associated with the correlated access module. For example, one set of backup configuration data 188 may be correlated with access module 25' and, therefore, indicate the configuration settings that are to be used in the event of detection of an operational problem associated with the access module 25'. Another of the sets of backup configuration data 188 may be correlated with the access module 25" and, therefore, indicate the configuration settings that are to be used in the event of detection of an operational problem associated with the access module 25". Yet another set of backup configuration data 188 may be correlated with the access module 25'" and, therefore, indicate the configuration settings that are to be used in the event of detection of an operational problem associated with the access module 25'".

When the control logic 112 of the protection module 30 receives a notification indicating that an operational problem associated with one of the access modules 25', 25", or 25'" has been detected, the control logic 112 retrieves the set of configuration data 188 correlated with the problematic module 25', 25", or 25'". Based on the retrieved configuration data 188, the control logic 112 then updates the configuration settings in the registers 132 (FIG. 5) such that bonding is switched from the problematic access module to the protection module 30, as described above. In this regard, the control logic 112, based on the retrieved configuration data 188, automatically provisions the protection module 30 such that the backup bonding engine 29 of the module 30 bonds the bonding group previously bonded by the problematic access module 25', 25", or 25'".

An exemplary use and operation of the system 10 will be described below. In this regard, assume that Bonding Group A is to be used for each data packet received from the network 12 having a particular VLAN tag, referred to hereafter as "Tag A." Also assume that the primary bonding engine 29 for Bonding Group A is located on the access module 25'. Further assume that Bonding Group A includes one subscriber line 18 terminated by access module 25', one subscriber line 18 terminated by access module 25", and one subscriber line 18 terminated by access module 25'" (assuming that the packet is fragmented into at least three fragments).

After provisioning and once data communication commences, a data packet having Tag A in its header is received by the switch module 33 from the network 12. Based on the configuration settings in the registers 92 (FIG. 4) and Tag A in the packet's header, the switch module 33 transmits the data packet to the access module 25'. The bonding engine 29 of the access module 25' fragments the packet into a plurality of fragments. Further, the bonding engine 29 of the module 25', based on the configuration settings in the registers 72 of the module 25', defines the headers of such fragments, such that the header of at least one fragment identifies the subscriber line 18 of Bonding Group A terminated by the module 25', the header of at least one fragment identifies the subscriber line

18 of Bonding Group A terminated by the module 25", and the header of at least one fragment identifies the Subscriber Line 18 of Bonding Group A terminated by the module 25'''.

The fragment identifying the subscriber line 18 terminated by the module 25' is transmitted from the bonding engine 29 of the module 25' to the fragment handler 41 of the module 25'. Based on the fragment's subscriber line address, the fragment handler 41 interfaces the fragment with the module's physical layer 28 such that the subscriber line 18 of Bonding Group A terminated by the module 25' carries the fragment.

The fragment identifying the subscriber line 18 terminated by the module 25" is transmitted to the switch module 33. Based on the fragment's module address, the switch module 33 transmits the fragment to the module 25". Based on the fragment's subscriber line address, the fragment handler 41 of the module 25" interfaces the fragment with the module's physical layer 28 such that the subscriber line 18 of Bonding Group A terminated by the module 25" carries the fragment.

The fragment identifying the subscriber line 18 terminated by the module 25''' is transmitted to the switch module 33. Based on the fragment's module address, the switch module 33 transmits the fragment to the module 25". Based on the fragment's subscriber line address, the fragment handler 41 of the module 25''' interfaces the fragment with the module's physical layer 28 such that the subscriber line 18 of Bonding Group A terminated by the module 25''' carries the fragment.

When fragments are received by the modules 25', 25", and 25''' from subscriber lines 18 of Bonding Group A, the fragments are transmitted to the bonding engine 29 of the module 25' based on the configuration settings in the registers 72 (FIG. 3) of the modules 25', 25", and 25'''. The bonding engine 29 of the module 25' reassembles such fragments into at least one message, which is packetized by the packet processing element 32 of the module 25' into at least one data packet compatible with the network 12. The data packet is transmitted from the module 25' to the switch module 33, which transmits the data packet to the network 12.

Figure 8:
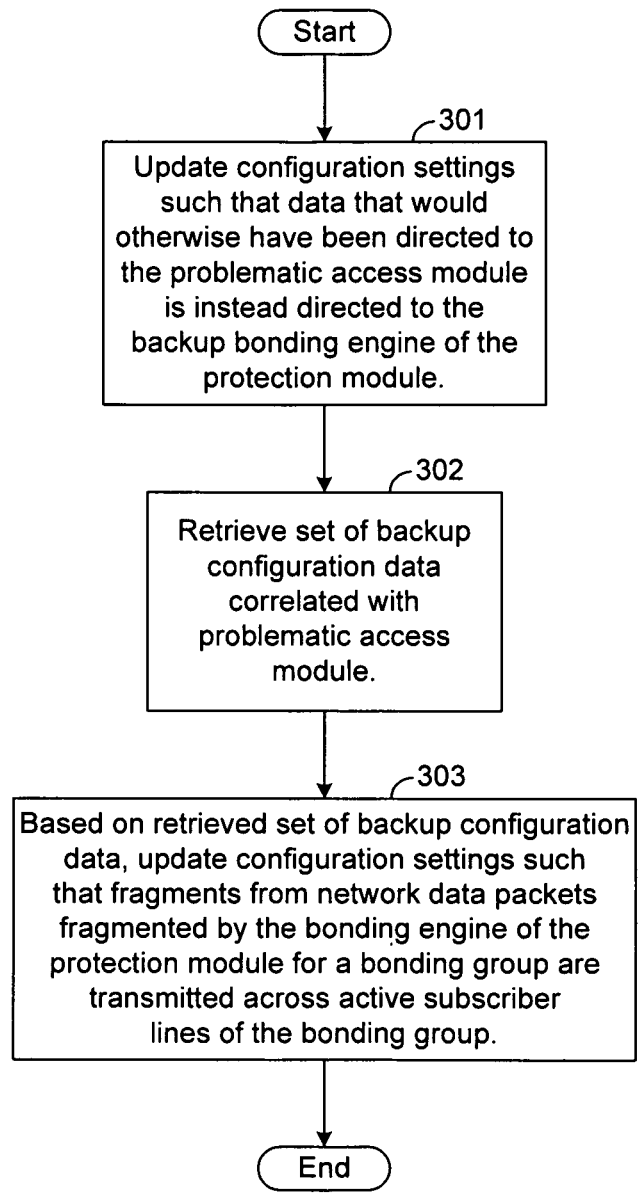
FIG. 8 is a flow chart illustrating an exemplary method for responding to a detection of an operational problem associated with an access module, such as is depicted by FIG. 2.

For illustrative purposes assume that the access module 25' fails such that the switch module 33 and the other modules 25" and 25''' cannot communicate with the module 25'. The switch module 33 eventually detects an operational problem associated with the module 25' and initiates a backup switch to switch bonding from the problematic module to the backup bonding engine 29 of the protection module 30. In this regard, in block 301 of FIG. 8, the control logic 82 updates the configuration settings stored in the registers 92 (FIG. 4) of the switch module 33 such that data packets having Tag A in their headers are routed to the protection module 30 instead of the access module 25'. The control logic 82 also updates the configuration settings stored in the registers 92 such that fragments received by the modules 25" and 25''' from subscriber lines 18 of Bonding Group A are transmitted to the backup bonding engine 29 of the protection module 30 instead of the bonding engine 29 of the failed access module 25'.

The control logic 82 of the switch module 33 also informs the protection module 30 that an operational problem has been detected for the problematic module 25'. In response, the control logic 112 of the protection module 30 retrieves the set of backup configuration data 188 correlated with the problematic module 25', as shown by block 302 of FIG. 8. Based on the backup configuration data 188, the control logic 112 loads configuration settings into the registers 132 (FIG. 5) of the protection module 30 such that fragments from network data packets for Bonding Group A fragmented by the backup bonding engine 29 include module addresses and subscriber line addresses identifying the subscriber lines 18 of bonding group A terminated by the operational modules 25" and 25''', as shown by block 303 of FIG. 8. Once the foregoing configuration setting updates of the switch module 33 and the protection module 30 are effectuated, bonding has effectively been switched from the failed access module 25' to the protection module 30.

In this regard, assume that a data packet having Tag A in its header is received by the switch module 33 from the network 12 after the bonding has been switched to the protection module 30, as described above. Based on the updated configuration settings in the registers 92 (FIG. 4) and the Tag A in the packet's header, the switch module 33 transmits the data packet to the protection module 30. The backup bonding engine 29 of the protection module 30 fragments the packet into a plurality of fragments. Further, the backup bonding engine 29 of the module 30, based on the updated configuration settings in the registers 132 (FIG. 5) of the module 30, defines the headers of such fragments such that at least one fragment identifies the subscriber line 18 of Bonding Group A terminated by the module 25" and at least one fragment identifies the subscriber line 18 of Bonding Group A terminated by the module 25" (assuming that the packet is fragmented into at least two fragments).

The fragment identifying the subscriber line 18 terminated by the module 25" is transmitted to the switch module 33. Based on the fragment's module address, the switch module 33 transmits the fragment to the module 25". Based on the fragment's subscriber line address, the fragment handler 41 of the module 25" interfaces the fragment with the module's physical layer 28 such that the subscriber line 18 of Bonding Group A terminated by the module 25" carries the fragment.

The fragment identifying the subscriber line 18 terminated by the module 25" is transmitted to the switch module 33. Based on the fragment's module address, the switch module 33 transmits the fragment to the module 25'. Based on the fragment's subscriber line address, the fragment handler 41 of the module 25" interfaces the fragment with the module's physical layer 28 such that the subscriber line 18 of Bonding Group A terminated by the module 25" carries the fragment.

When fragments are received by the modules 25" and 25" from subscriber lines 18 of the Bonding Group A, the fragments are transmitted to the backup bonding engine 29 of the protection module 30 based on the control settings in the registers 72 (FIG. 3) of the modules 25" and 25'. The backup bonding engine 29 of the module 30 reassembles such fragments into at least message, which is packetized by the packet processing element 32 of module 30 into at least one data packet compatible with the network 12. The data packet is transmitted from the module 30 to the switch module 33, which transmits the data packet to the network 12.

Accordingly, after the access module 25' fails, bonding is switched from the bonding engine 29 of the failed module 25' to the backup bonding engine 29 of the protection module. Thus, communication via Bonding Group A is allowed to continue despite the failure of the access module 25', although the overall data rate of the virtual channel provided by Bonding Group A may be slightly degraded due to the loss of the subscriber line 18 terminated by the failed access module 25'. However, communication via such virtual channel survives the failure of the access module 25' such that service to the customer is maintained, albeit slightly degraded, until the problem with the access module 25' can be corrected.

Now, therefore, the following is claimed:
1. A method, comprising the steps of:
   bonding a plurality of subscriber lines via a first bonding engine of a first module such that first fragments of a first data packet fragmented by the first bonding engine are transmitted across each of the plurality of subscriber lines, the plurality of subscriber lines including at least a first subscriber line and a second subscriber line;
detecting an operational problem associated with the first module;
bonding the plurality of subscriber lines via a second bonding engine of a second module in response to the detecting step such that second fragments of a second data packet fragmented by the second bonding engine are transmitted across each of the plurality of subscriber lines;
transmitting at least one of the first fragments from the first bonding engine via a chassis backplane to an access module terminating at least the first subscriber line;
transmitting the at least one of the first fragments from the access module across the first subscriber line;
transmitting at least one of the second fragments from the second bonding engine via the chassis backplane to the access module;
transmitting the at least one of the second fragments from the access module across the first subscriber line;
inserting the first module into a slot of a chassis;
connecting the first module to a backplane of the chassis;
inserting the second module into a slot of the chassis;
connecting the second module to the backplane;
inserting the third module into a slot of the chassis;
connecting the third module to the backplane;
inserting a fourth module into a slot of the chassis;
connecting the fourth module to the backplane;
receiving a first plurality of data packets at the third module, each of the first plurality of data packets having an address identifying communication equipment at a customer premises;
transmitting each of the first plurality of data packets from the third module across the backplane to the first module based on configuration settings that map the address to the first module;
fragmenting, via the first bonding engine, each of the first plurality of data packets into fragments for transmission across at least each of the first and second subscriber lines;
updating the configuration settings in response to the detecting step such that the updated configuration settings map the address to the second module;
receiving a second plurality of data packets, each of the second plurality of data packets having the address;
transmitting each of the second plurality of data packets from the third module across the backplane to the second module based on the updated configuration settings; and
fragmenting, via the second bonding engine, each of the second plurality of data packets into fragments for transmission across at least each of the first and second subscriber lines.

2. The system of claim 1, wherein the address is a virtual local area network (VLAN) tag.

* * * * *